(12) United States Patent
Lin

(10) Patent No.: US 6,843,113 B2
(45) Date of Patent: Jan. 18, 2005

(54) PRESSURE DETECTING DEVICE FOR TIRES OF A VEHICLE

(75) Inventor: Sheng-Hsiung Lin, Kaohsiung (TW)

(73) Assignee: Lite-On Automotive Corp., Kaohsiung (TW)

( * ) Notice: Subject to any disclaimer, the term of this patent is extended or adjusted under 35 U.S.C. 154(b) by 46 days.

(21) Appl. No.: 10/341,036

(22) Filed: Jan. 13, 2003

(65) Prior Publication Data

US 2004/0045348 A1 Mar. 11, 2004

(30) Foreign Application Priority Data

Sep. 10, 2002 (TW) .......................... 91120532 A

(51) Int. Cl.[7] .............................................. B60C 23/02
(52) U.S. Cl. ...................................................... 73/146.5
(58) Field of Search ............................. 73/146, 146.5; 340/442–447

(56) References Cited

U.S. PATENT DOCUMENTS 5,540,092 A * 7/1996 Handfield et al. ......... 73/146.5
6,507,276 B1 * 1/2003 Young et al. ............... 340/447

* cited by examiner

Primary Examiner—Willam Oen
(74) Attorney, Agent, or Firm—Alan D. Kamrath; Nikolai & Mersereau, P.A.

(57) ABSTRACT

A pressure detecting device has a main control unit, at least one pressure detecting unit and a display. The display is electrically connected to a main controller of the main control unit and has at least one illustrating and illuminating symbol to show the condition of tire detected by the pressure detecting unit. Each illustrating and illuminating symbol has multiple symbol elements, such that the condition in the tire can be exactly shown to the user with the illustrating and illuminating symbols on the display.

11 Claims, 3 Drawing Sheets

PRESSURE DETECTING DEVICE FOR TIRES OF A VEHICLE

BACKGROUND OF THE INVENTION

1. Field of the Invention

The present invention relates to a pressure detecting device, and more particularly to a pressure detecting device for tires of a vehicle and with a user-friendly display.

2. Description of Related Art

Failure or malfunction of certain car components can lead to serious accidents and loss of life. One example of this is when a car tire loses pressure through a puncture, whereby the car will become unstable. Conversely, inflating the tire to an excessive pressure may lead to the tire blowing out when the car is at high speed. Therefore, a pressure detecting device is mounted in the tire of the vehicle to detect the pressure in the tire. With the detecting device, an alarm will generate to alert the driver when the pressure in the tire is over or lower than a desired level.

The conventional detecting device substantially comprises a main controller and four detectors. Each detector is received in one of the tires of the vehicle and is electrically connected to the main controller by wire or wirelessly. A display is electrically connected to the detecting device to easily inform the driver of the tires' pressure status. The display is mounted near the steering wheel of the vehicle, such that the alarm generated on the display can be noticed by the driver immediately. With reference to FIG. 4, a conventional display for a detecting device comprises a body (50) and multiple illustrating and illuminating symbols (51,52) mounted on the body (50). Each symbol (51,52) corresponds to one condition of the tire pressure such as at high pressure, at low pressure, at desired pressure level or dangerous and so on. The symbols (51,52) can indicate the condition of the tires to the user by means of the illumination of the symbols (51,52).

However, each symbol (51,52) on the conventional display only has a single symbol element, whereby the user cannot be aware of the exact condition of the tires. Thus, the use of the conventional detecting device is not versatile.

To overcome the shortcomings, the present invention tends to provide a highly informative and easily read pressure detecting device to mitigate or obviate the aforementioned problems.

SUMMARY OF THE INVENTION

The main objective of the invention is to provide a pressure detecting device for monitoring tires of a vehicle and that can show the condition on the tires exactly with illustrating and illuminating symbols. The pressure detecting device has a main control unit, at least one pressure detecting unit and a display. The main control unit has a main controller. Each pressure detecting unit is electrically connected to the main control unit to detect a condition of a corresponding one of the tires. Each pressure detecting unit comprises a detecting controller electrically connected to the main controller and a pressure detector electrically connected to the detecting controller. The display is electrically connected to the main controller and has at least one illustrating and illuminating symbol to show the condition of tire. Each illustrating and illuminating symbol has multiple symbol elements, such that the condition in the tire can be exactly shown to the user with the illustrating and illuminating symbols on the display.

Other objectives, advantages and novel features of the invention will become more apparent from the following detailed description when taken in conjunction with the accompanying drawings.

DETAILED DESCRIPTION OF PREFERRED EMBODIMENT

Figure 1:
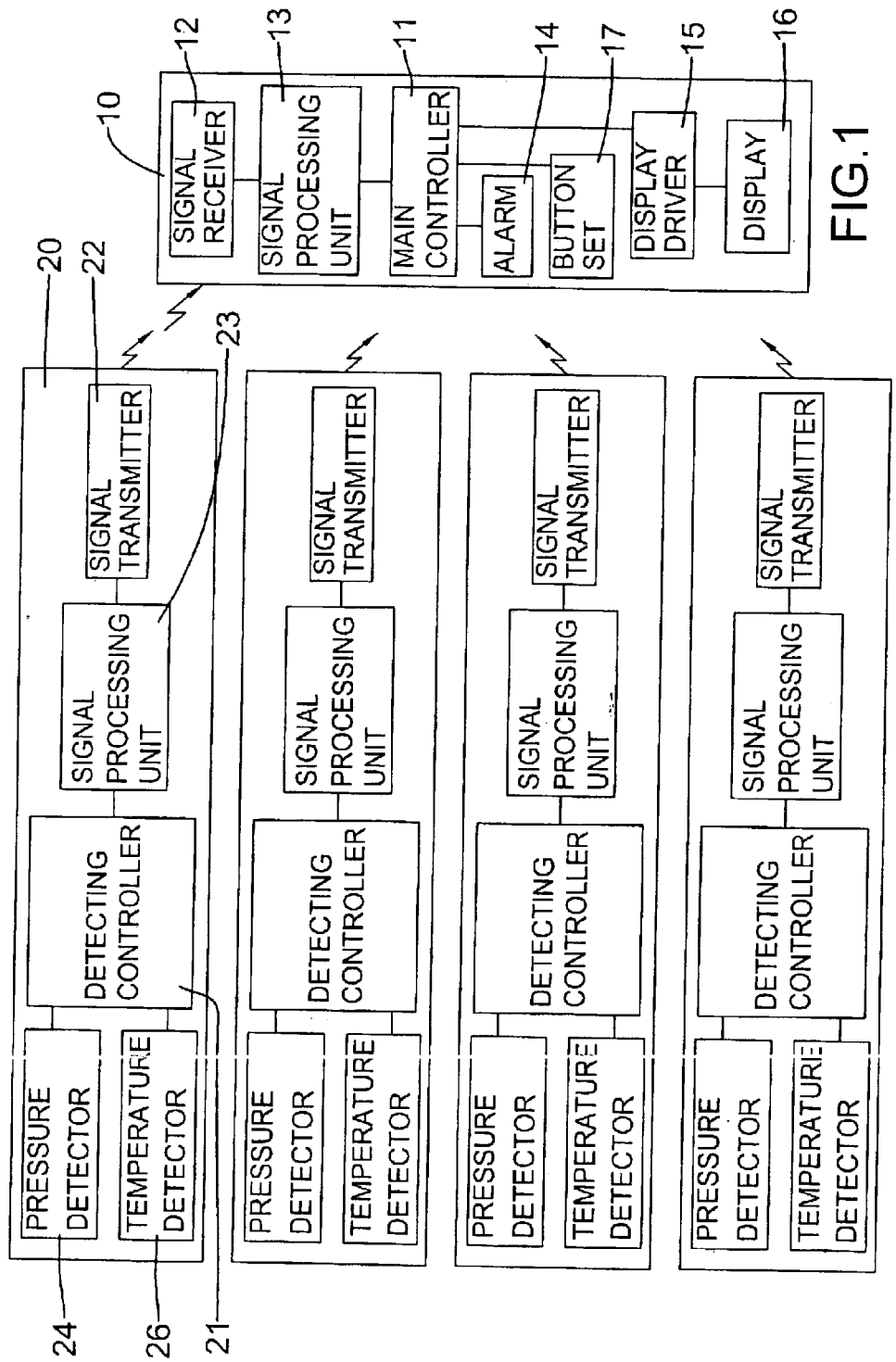
FIG. 1 is a block diagram of a pressure detecting device in accordance with the present invention.

With reference to FIG. 1, a detecting device in accordance with the present invention comprises a main control unit (10) and multiple detecting units (20). The main control unit (10) comprises a main controller (11), a signal processing unit (13), a signal receiver (12), an alarm (14) and a display set. The main controller (11) has a calculation program for calculating a base point and a safety scope according to pressure values detected by the detecting units (20). The signal processing unit (13) is electrically connected to the main controller (11), and the signal receiver (12) is electrically connected to the signal processing unit (13). The alarm (14) is electrically connected to the main controller (11). The display set comprises a display driver (15) electrically connected to the main controller (11) and a display (16) electrically connected to the display driver (15). In addition, the main control unit (10) further comprises a button set (17) electrically connected to the main controller (11).

The detecting units (20) are electrically connected to the main control unit (10). Each detecting unit (20) is mounted in one of the tires of the vehicle to detect the pressure in the corresponding tire. Each detecting unit (20) comprises a detecting controller (21), a pressure detector (24), a signal processing unit (23) and a signal transmitter (22). The pressure detector (24) is electrically connected to the detecting controller (21) to measure the pressure in the corresponding tire and sends the detected pressure value to the detecting controller (21). The signal processing unit (23) is electrically connected to the detecting controller (21), and the signal transmitter (22) is electrically connected to the signal processing unit (23). The pressure value detected in the tire by the pressure detector (24) is sent to the signal processing unit (23) from the detecting controller (21) and is sent out from the signal transmitter (22). The signal receiver (12) of the main control unit (10) receives the pressure value signal and sends the signal to the main controller (11) through the signal process unit (13). In addition, each detecting unit (20) further comprises a temperature detector (26) electrically connected to the detecting controller (21) to measure temperature in the corresponding tire.

Figure 2:
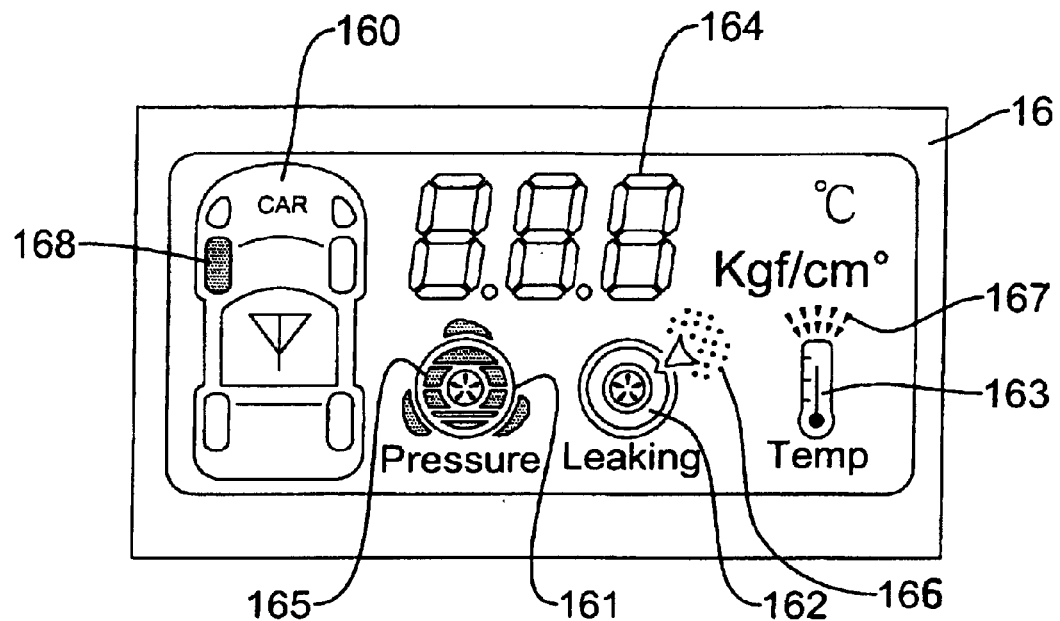
FIG. 2 is a plan view of a display of the pressure detecting device in FIG. 1.
Figure 3:
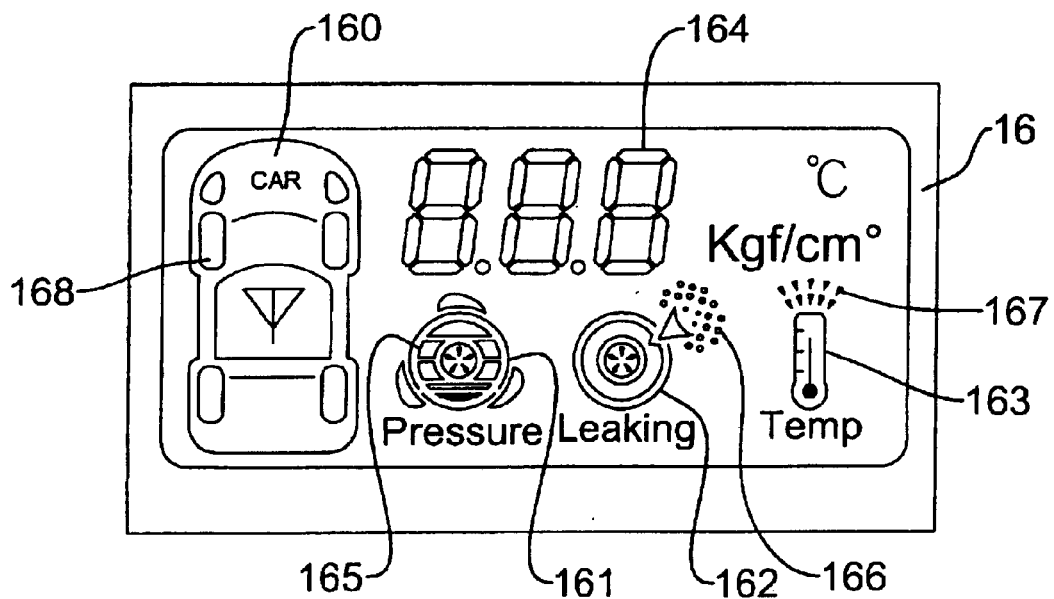
FIG. 3 is an operational plan view of the display in FIG. 2.
Figure 4:
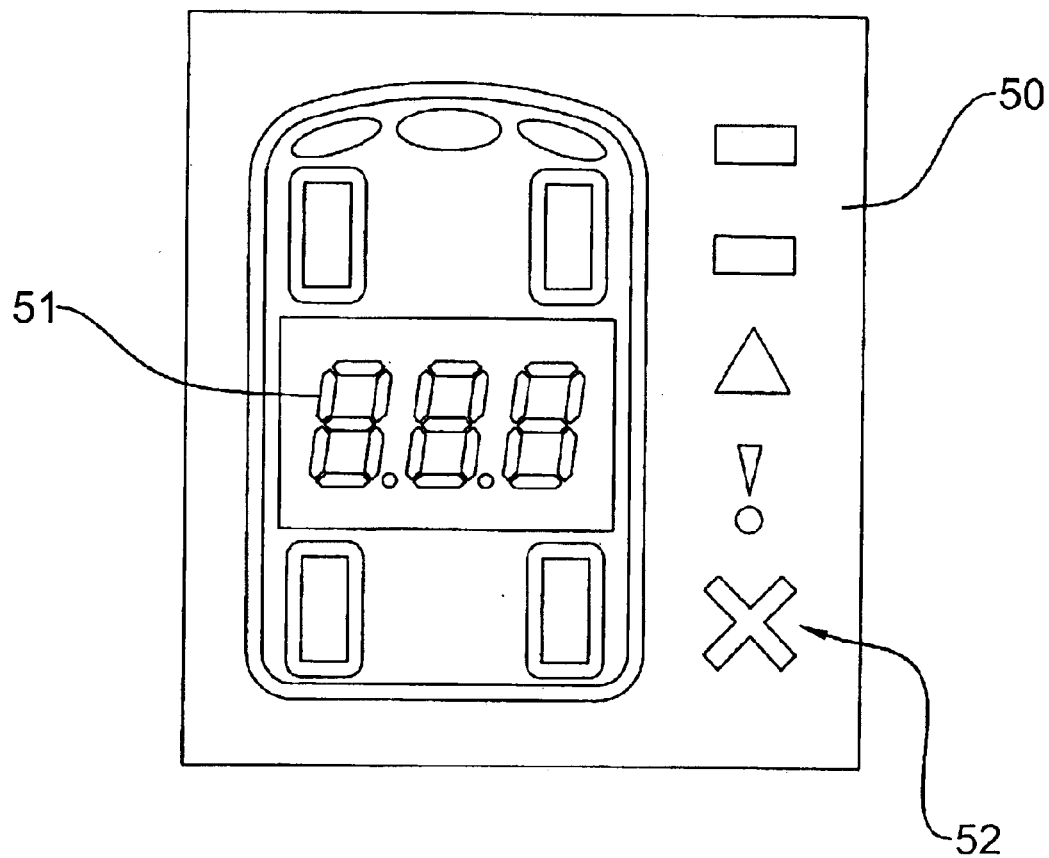
FIG. 4 is a plan view of a display of a conventional pressure detecting device in accordance with the prior art.

With reference to FIGS. 1 to 3, the display (16) has multiple illustrating and illuminating symbols (160,161,162, 163,164) to show the condition of the tire detected by the pressure detecting units (20). Each illustrating and illuminating symbol (160,161,162,163,164) has multiple symbol elements (165,166,167,168) to show a condition of the corresponding tire. The multiple symbol elements (165,166, 167) of at least one of the illustrating and illuminating symbols (161,162,163) are arranged in multiple layers to show different variations of the condition of the corresponding tire. In practice, the first symbol (160) shows which tire of the vehicle is being shown on the display (16). The first symbol (16) has at least four symbol elements (168) respectively corresponding to the tires of the vehicle. When one of the symbol elements (168) lights, that means the condition of the corresponding tire is shown on the display (16).

The second symbol (161) shows the pressure level of the corresponding one of the tires. The second symbol (161) has multiple lateral symbol elements (165) arranged in multiple up and down layers. When all of the lateral symbol elements (165) light, that means the pressure in the corresponding tire is at a full level. When only some of the lateral symbol elements (165) light, as shown in FIG. 3, that means the pressure of the corresponding tire is at a low level. The second symbol (161) further has three peripheral symbol elements (not numbered) mounted around the lateral symbol elements (165). When the peripheral symbol elements light, as shown in FIG. 2, that means the pressure in the corresponding tire is over the desired level.

The third symbol (162) comprises multiple concentric rings each composed of multiple leakage symbol elements (166) to show the leakage of the corresponding tire. The layers of the leakage symbol elements (166) are concentrically arranged. When the leakage symbol element (166) at the inner layer lights, as shown in FIG. 3, that means the corresponding tire has a slight leakage. When all of the leakage symbol elements (166) light, that means the corresponding tire has a serious leakage. The fourth symbol (163) shows the temperature in the corresponding tire. The fourth symbol (163) has a main symbol element (not numbered) with a shape of a thermometer and two layers of auxiliary symbol elements (167) arranged on the top of the main symbol element. The fourth symbol (163) can show the temperature of the corresponding tire through the main symbol element in cooperation with the auxiliary symbol elements (167).

The fifth symbol (164) shows the numerical information about the corresponding tire. The fifth symbol (164) has three numerical symbol elements (not numbered) each having a capability of showing the numbers from zero to nine. The fifth symbol (164) can show the pressure value, leakage value or temperature value of the corresponding tire.

With the symbols (160,161,162,163,164) on the display (16), the user can quickly and exactly know the condition of the tires of the vehicle. When any problem happens to any tire of the vehicle, the user can be immediately informed from the alarm and the display. Consequently, the safety of driving the vehicle is improved. With the illuminating and illustrating symbols (160,161,162,163,164) on the display (16), the use of the detecting device is versatile.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pressure detecting device for tires of a vehicle comprising:

a main control unit comprising a main controller;

at least one pressure detecting unit electrically connected to the main control unit and adapted to detect pressure of a corresponding one of the tires, each at least one pressure detecting unit comprising a detecting controller electrically connected to the main controller and a pressure detector electrically connected to the detecting controller; and a display electrically connected to the main controller and having multiple illustrating and illuminating symbols each to show a condition of a tire detected by the at least one pressure detecting unit, wherein each illustrating and illuminating symbol has multiple symbol elements to show the condition of the corresponding tire; and with the multiple symbol elements of at least one of the multiple illustrating and illuminating symbols being arranged in multiple layers to show variations of the condition of the corresponding tire according to a number of the multiple layers being illuminated.

2. The pressure detecting device as claimed in claim 1, wherein the main control unit further comprises:

a signal processing unit electrically connected to the main controller;

a signal receiver electrically connected to the signal processing unit; and an alarm electrically connected to the main controller.

3. The pressure detecting device as claimed in claim 2, wherein the main control unit further comprises a button set electrically connected to the main controller.

4. The pressure detecting device as claimed in claim 2, wherein each at least one detecting unit further comprises:

a signal processing unit electrically connected to the detecting controller;

a pressure detector electrically connected to the signal processing unit of the detecting unit and adapted to measure pressure in a corresponding one of the tires of the vehicle; and a signal transmitter electrically connected to the signal processing unit of the detecting unit and signal receiver of the main control unit.

5. The pressure detecting device as claimed in claim 4, wherein each at least one pressure detecting unit further comprises a temperature detector electrically connected to the detecting controller and adapted to measure temperature in the corresponding tire.

6. The pressure detecting device as claimed in claim 1, wherein one of the multiple illustrating and illuminating symbols has at least four symbol elements to show which tire of the vehicle is being shown on the display.

7. The pressure detecting device as claimed in claim 1, wherein the at least one of the multiple illustrating and illuminating symbols has multiple lateral symbol elements arranged in multiple up and down layers show a pressure level in the corresponding one of the tires.

8. The pressure detecting device as claimed in claim 7, wherein the illustrating and illuminating symbol with the multiple lateral symbol elements further has multiple peripheral symbol elements mounted around the multiple lateral symbol elements.

9. The pressure detecting device as claimed in claim 1, wherein the at least one of the multiple illustrating and illuminating symbols has multiple concentric rings each composed of multiple leakage symbol elements and arranged in multiple concentric layers to show the leakage of the corresponding tire.

10. The pressure detecting device as claimed in claim 1, wherein the at least one pressure detecting unit further comprises a temperature detector electrically connected to the main control unit and adapted to measure temperature in the corresponding tire, wherein the at least one of the multiple illustrating and illuminating symbols has a main symbol element with a shape of a thermometer and two layers of auxiliary symbol elements arranged on the top of the main symbol element to show the temperature in the corresponding tire.

11. The pressure detecting device as claimed in claim 1, wherein one of the illustrating and illuminating symbols has three numerical symbol elements each having a capability of showing the numbers from zero to nine to show numerical information about the corresponding tire.

* * * * *